United States Patent

Funfstuck et al.

[15] 3,675,643
[45] July 11, 1972

[54] CARDIAC TACHOMETER

[72] Inventors: Horst Funfstuck; Shmuel Elazar, both of Camarillo, Calif.

[73] Assignee: Statham Instruments, Inc., Oxnard, Calif.

[22] Filed: Sept. 4, 1970

[21] Appl. No.: 69,796

[52] U.S. Cl. ..................................... 128/2.06 F, 324/78 J
[51] Int. Cl. ........................................... A61b 5/04
[58] Field of Search .................... 128/2.05 P, 2.05 T, 2.06 A, 128/2.06 F; 324/78 E, 78 J

[56] References Cited

UNITED STATES PATENTS

| | | | |
|---|---|---|---|
| 2,492,617 | 12/1949 | Boland et al. | 128/2.06 F |
| 3,174,478 | 3/1965 | Kahn | 128/2.06 F |
| 3,352,300 | 11/1967 | Rose | 128/2.06 A |
| 3,554,188 | 1/1971 | Lasch | 128/2.06 F |

*Primary Examiner*—William E. Kamm
*Attorney*—Philip Subkow and Kendrick and Subkow

[57] ABSTRACT

This application relates to means for measuring and recording the frequency of repetitive events which may be subject to large changes in frequency, and is particularly useful in connection with the measuring and recording of heartbeats. This is accomplished by generating a train of pulses responsive to events of interest, establishing a dc potential responsive to the frequency of said train of pulses, generating a linear sawtooth pulse whose amplitude is responsive to the frequency of the applied pulses and to said dc potential, comparing said amplitude of said sawtooth pulses with a reference voltage, and modifying said dc potential responsive to the difference between said reference voltage and said sawtooth pulse amplitude, and providing means responsive to the magnitude of said dc potential to indicate the frequency of the pulses of interest.

6 Claims, 3 Drawing Figures

PATENTED JUL 11 1972 3,675,643

HORST FUNFSTUCK
SHMUEL ELAZAR
INVENTORS.

BY KENDRICK and SUBKOW
Philip Subkow
ATTORNEYS

CARDIAC TACHOMETER

BACKGROUND OF THE INVENTION

While the system of our invention is useful wherever it is desired to obtain intelligence of the frequency of repetitive events, it is particularly useful where the intervals between the events are substantial.

Such systems may be found in the measurement of rotational speeds in rpm's, and vibrations of mechanical systems and of other systems. The system for which the following circuits have been designed and which constitutes the preferred mode of operation of our invention is for the determination of respiration rates and heartbeat rates.

While in general, in a normal, healthy person, the heart generates a uniform pulse train of relatively regular frequency, where there is a malfunction this frequency may change or vary over a large range of frequency. It has been suggested to determine the pulse rate by averaging the periodic output of EKG by an averaging RC circuit. Such a system will represent the frequency of the pulses, where the pulses are substantially of equal period, waveshape and at substantially constant frequency.

However, if the frequency is either irregular or varies widely, the average value may be grossly misrepresentative of the frequency of the pulse train.

Where the signal summed by the RC circuit is displayed upon a visual meter or is otherwise recorded, it is desirable that the output which is recorded or displayed be relatively steady when the frequency of the pulses is substantially constant. For such purposes, it is desirable that the RC circuit have a time constant sufficiently large so that any insubstantial variations in the pulse frequency do not affect the level of potential at the RC circuit.

On the other hand, where it is desired that the readout system respond rapidly to rapid changes in the frequency of the pulse train, it is desirable that the RC circuit have a very short time constant.

As a practical matter, it is desirable that the time constant of the RC circuit be in the order of about 10 times the longest interval between pulses of the pulse train of interest.

Variations in pulse rate, as referred to above, occur in heartbeat measurements.

It is not unusual, even in normally healthy persons, to find irregular heartbeats such that the EKG signal has a variable and sometimes irregularly variable heartbeat pulse output. In the case of persons with cardiac malfunction, the heartbeat may be of abnormally high frequency, or of irregular frequency, or have an irregular variation of the frequency of the heartbeat pulse. These variations may be large and may, in fact in some case, such as in heart stoppage, drop to zero. The heartbeat rate and therefore the EKG pulse, may vary from zero to a frequency substantially in excess of the normal heartbeat frequency, for example, up to 180 pulses per minute.

Thus, for example, assume a person having a normal pulse rate of 70 beats per minute average value; the heart stops, and the beats fall to zero. Where the RC circuit has a long time constant, there will be an interval of time before the unit responds to report this event. This time may be sufficiently large to cause brain damage.

In the same fashion, if the heartbeat substantially increases, for example, to 180 beats per minute, the system will not respond for a considerable period because of the large time constant of the RC circuit.

It is an object of our invention to provide a system which will follow and promptly report pulse rates which vary over a wide range or frequency and be responsive to either rapid or slow changes in pulse frequency.

It is a further object of our invention to provide a cardiac tachometer which will follow and report promptly heartbeats which may vary over a wide range of frequency and be responsive to either rapid or slow changes in frequency.

This invention will be further described in connection with the drawings, in which.

Figure 1:
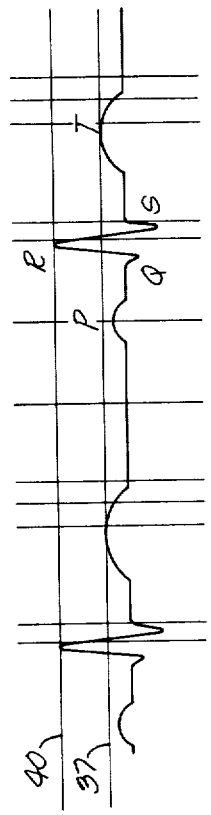
FIG. 1 is a schematic circuit diagram of the pulse measuring system of our invention.
Figure 2:
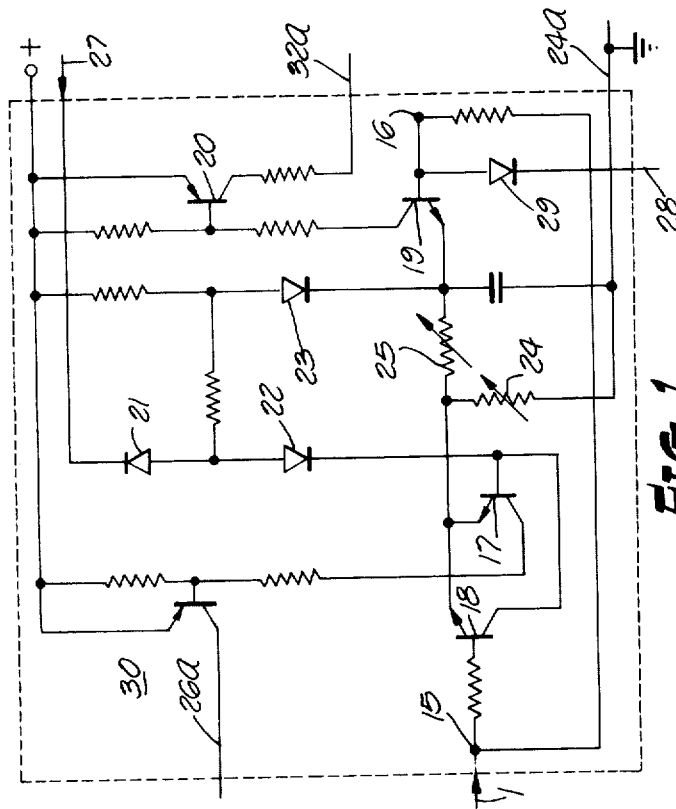
FIG. 2 is a schematic circuit diagram of the application of the system of FIG. 1 to a cardiac tachometer.

In FIG. 1 and 2, 1 is a source of a train of square wave pulses which enter an RC circuit composed of resistor 2 and capacitor 3. The input 7 to the amplifier 6 of unit gain is connected at 4. The output 8 of the amplifier 6 is connected at 5 which is at the same potential as 4 at the RC circuit.

The input of the RC circuit is connected through the buffer amplifier 6 to the ramp voltage generator 10 composed of an operational amplifier 11, resistors 9 and 12, and the gate transistor 13, shunting the grounded capacitor 14. The base of the transistor 13 is connected to the output of a one-shot multivibrator 31a, whose input is connected to the output of the one-shot multivibrator 31, whose input is connected to the input 1.

The output of the operational amplifier 11 is connected via 15a to the inputs 15 and 16 of the voltage comparator 30, composed of transistors 17 and 18 on the one hand and 19 and 20 on the other, all coupled by the gating diode 21, isolation diode 22, and temperature compensating diode 23.

The reference voltages at the emitter of 17 and 19 are set by the variable resistors 24 and 25, with the potential at 19 set higher than that at 17.

The collector of the transistor 17 is connected to the base of the transistor 26 via 26a and the collector of the transistor 19 is connected to the base of the transistor 20 whose collector is connected to the base of the transistor 32 via 32a. The emitter of transistor 32 is grounded through 21a.

The collectors of the transistors 26 and 32 are connected through suitable resistors 30a and 35 to the RC circuit 2 and 3 via 33.

The base of the transistor 17 is connected through diodes 22 and 21 and line 27 and 28 to the output of the one-shot multivibrator 31, whose output is connected as previously described.

The base of 19 is connected through the diode 29 to line 28 previously described. The input of 31 is connected to the input 1.

The output 8 of the amplifier 6 is connected to a suitable meter or recorder 34.

Capacitor 3 is charged by the square wave pulse train passing through 2 to a potential proportional to the frequency of the square wave pulse train. Since amplifier 6 has a unitary gain, the voltages at 4, 8 and 5 are all equal. The potential at 4 will be proportional to the frequency of the pulse train charging 3.

A pulse entering the one-shot multivibrator 31 results in a pulse which is delivered to 17 and 19 and therefore 31 shuts off on the termination of the pulse, and the one-shot multivibrator 31a is then activated to establish bias at the base of the gate transistor 13, to short the capacitor 14 and to connect the output of 11 to ground. This generates a sawtooth pulse.

With resistor 9 equal in value to resistor 12, the ramp voltage is linear, and the resultant sawtooth pulse is at a frequency equal to the frequency of the train of pulses entering at 1.

The relationship of the voltage $e_i$ at 5 to the amplitude of the sawtooth wave at the output of 11, $e_o$, is given by the formula $e_o = 2e_i t/CR$, where $t$ is the period of the sawtooth wave which, as stated above, is proportional to the frequency of the incoming square wave pulse train; and $C$ and $R$ are the capacitance and resistance of 14 and 9. See *Electronic Engineering*, December 1969, page 76.

If the intervals between succeeding pulses are all of the same value, the succeeding sawtooth wave trains will be of like uniform frequency and like amplitude, so long as the input potential at 5 is constant. Since $t$ is determined by the frequency of the input pulse at 1, $e_o$ will remain constant if the frequency of the pulse train at 1 remains constant. If the pulse rate changes, then the potential at 5 will change very slowly responsive to the change in the pulse rate and cause a corresponding change in the amplitude of the sawtooth wave generated at 11.

The arrival of a pulse at the input turns on the comparator 30 under the influence of the one-shot 31 and diodes 21 and 29 and comparator 30. With the emitter of 19 set at a higher potential than the emitter at 17, by proper adjustment of the resistors 24 and 25, if the potential at 15, when the pulse voltage is applied, is less than that at the emitter of 17 and thus less than that at the emitter of 19; transistor 26 is biased so that current flows through 30a and 33 to the capacitor 3, the circuit through 32 and its associated resistor 35 remaining open. This raises the potential at 3.

The potential at the emitter of 17 may be set to correspond to the potential at 15 which is proportional to a pulse frequency at 1 of about 90 percent of the normal heartbeat rate and that at the emitter of 19 to a pulse frequency of 110 percent of the normal heartbeat rate.

Should the frequency of the pulse train rise, that is, decrease the interval $t$ so as to lower the potentials at 15 and 16 below that in the emitter of 17, the condenser 3 will be charged through 33; and the voltage at 3 measured at 34 will rise rapidly to a value proportional to the more rapid pulse rate.

Should the pulse rate decrease so as to increase the interval $t$, the voltage at 15 and 16 will rise. If the voltage rises above the voltage at the emitter at 17 but does not rise above that at the emitter of 19, the circuits through 26 and 32 remain open, and the voltage at 3 will remain substantially unchanged, provided the potential levels between 17 and 19 are sufficiently close together.

If the pulse rate decreases sufficiently so that the resultant potential at 15 and 16 is in excess of the potential at the emitter of 19, then transistor 32 is biased to indicate condition and the circuit through 26 remains open. Capacitor 3 is connected to ground through 32, 33 and 35. The potential at 3 promptly falls to a value proportional to the new pulse rate at 3. This new potential is measured at 34 as a measure of the relevant pulse rate.

In applying the circuit of FIG. 1 to the reporting of heartbeats, we employ as a preferred embodiment the circuit of FIG. 2, to generate the pulse train which enters 1 of FIG. 1.

Figure 3:
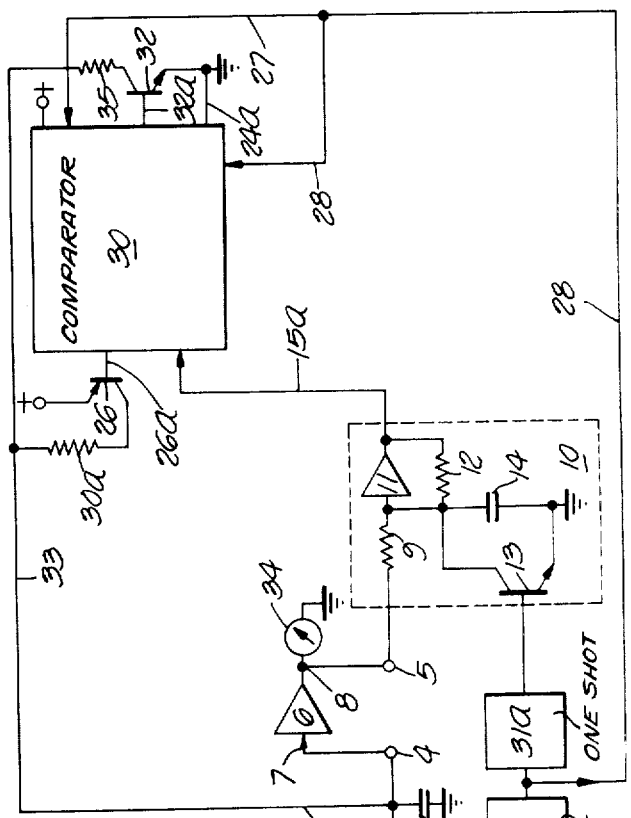
FIG. 3 is a form of heartbeat wave.

The EKG 35 whose output applied at capacitor 33a is fed to an R pulse detector 36. The R pulse detector is a peak pulse generator responsive to the potentials of the R wave, which are in excess of the maximum potential levels of the other component waves of the heartbeat wave. This is illustrated as the potential levels above 37 on FIG. 3.

With no pulse entering amplifier 39, the capacitor 42 is at a potential determined by the voltage divider 40a and 43. The resistance 41 is of a magnitude to produce a large time constant of the capacitor 42 resistance 41 circuit. A pulse entering via capacitor 33a must establish a potential input at amplifier 39 which is greater than that at 42 to cause the amplifier 39 to be forward biased. This potential is set to be that proportional to the potential equivalent to 37 (FIG. 3) by suitable adjustment of the voltage divider, 43, 40a. When the potential at amplifier 39 rises to the level equivalent to the voltage at 40 (FIG. 3) of the R wave and passes over the peak, amplifier 39 becomes reverse biased and the output at 39 goes to the reference potential, which may be zero. The capacitor 42 on arrival of the subsequent R pulse will be at substantially but slightly lower potential than that previously attained on the arrival of the previous R pulse (see supra) due to the small discharge during said interval through the high resistance 41. The subsequent pulse must then be at a potential at leas that of the residual charge in 42 to bias the 39.

The result is a square wave pulse at the frequency of the R wave.

The pulse thus generated is the pulse referred to in the discussion in connection with FIG. 1.

What is claimed is:

1. A cardiac tachometer comprising:
   means to establish a train of pulses responsive to heartbeats;
   means to establish a dc potential responsive to said train of pulses;
   means to establish a sawtooth pulse responsive to said dc potential and to the frequency of such train of pulses;
   means to establish a reference voltage;
   means for comparing the potential of the amplitude of said sawtooth pulse with a reference voltage;
   means for modifying said dc potential responsive to the difference between the potential of the amplitude of said sawtooth pulses and said reference voltage; and
   readout means responsive to said dc potential to indicate the frequency of said heartbeats.

2. A cardiac tachometer according to claim 1, in which said means for establishing a train of pulses responsive to said heartbeats includes a pulse detector responsive to the R pulse of said heartbeat, said R pulse detector comprising an RC circuit responsive to said first mentioned train of pulses, means to apply to said RC circuit a potential responsive to the potential of the train of pulses arising from that fraction of the R portion of the pulse whose amplitude is in excess of the amplitude of the remaining portions of said pulses, means responsive to said potentials at said RC circuit to generate a train of square wave pulses at the frequency of said R wave fraction, and means responsive to the frequency of such train of square waves to generate the aforesaid dc potential.

3. In the cardiac tachometer of claim 1, said means to establish a dc potential, including an RC circuit, and said means for modifying said dc potential, including means to apply said potential difference to said RC circuit.

4. In the cardiac tachometer of claim 1 in which said means for establishing a train of pulses includes a pulse detector responsive to the R pulse in which said means for establishing a train of pulses responsive to said heartbeats comprises an RC circuit, said means for comparing said dc potential with said reference potential, comprising means to establish a reference potential corresponding to the frequency of heartbeats of rate less than normal heartbeat rate and a second reference voltage corresponding to a frequency greater than the normal heartbeat rate frequency and at a potential higher than the potential of said first mentioned reference potential and means for comparing the potential of the amplitude of the sawtooth pulse with each of said reference potentials, means for applying the difference between the amplitude potential and the said lower potential to said RC circuit when said lower potential is in excess of the potential of said amplitude potential and means for discharging the RC circuit when the potential of said amplitude is in excess of said higher potential, and establishing a dc potential responsive to the frequency of said train of pulses.

5. A cardiac tachometer according to claim 1, in which said means for establishing a train of pulses responsive to said heartbeats includes a pulse detector responsive to the R pulse of said heartbeat, said R pulse detector comprising an RC circuit responsive to said first mentioned train of pulses, means to apply to said RC circuit a potential responsive to the potential of the train of pulses arising from that fraction of the R portion of the pulse whose amplitude is in excess of the amplitude of the remaining portions of said pulse, means responsive to said potentials at said RC circuit to generate a train of square wave pulses at the frequency of such train of square waves at the frequency of said R wave fraction and means responsive to the frequency of such train of square waves to generate the aforesaid dc potential, and said means for modifying said dc potential, including means to apply said potential difference to said RC circuit.

6. A cardiac tachometer according to claim 1, in which said means for establishing a train of pulses responsive to said heartbeats includes a pulse detector responsive to the R pulse of said heartbeat, said R pulse detector comprising an RC circuit responsive to said first mentioned train of pulses, means to apply to said RC circuit a potential responsive to the potential of the train of pulses arising from that fraction of the R portion of the pulse whose amplitude is in excess of the amplitude of the remaining portions of said pulse, means responsive to said potentials at said last named RC circuit to generate a train of square wave pulses at the frequency of said train of pulses to generate the aforesaid dc potential, said means for modifying said dc potential including means to apply said potential difference to said first mentioned RC circuit, and said means for comparing said dc potential with said reference potential, comprising means to establish a reference potential responsive to the frequency of heartbeats of rate less than normal heartbeat rate and means for establishing a second reference voltage responsive to a frequency greater than the normal heartbeat rate frequency and at a potential higher than the potential said first mentioned reference potential and comparing the potential of the amplitude of the sawtooth pulse with each of said reference potentials, means for applying the difference between the amplitude potential and the said lower potential to said first named RC circuit when said lower potential is in excess of the potential of said amplitude potential and means for discharging the RC circuit when the potential of said amplitude is in excess of said higher potential, and means for establishing a dc potential responsive to the frequency of said train of pulses.

* * * * *